Figure 1:
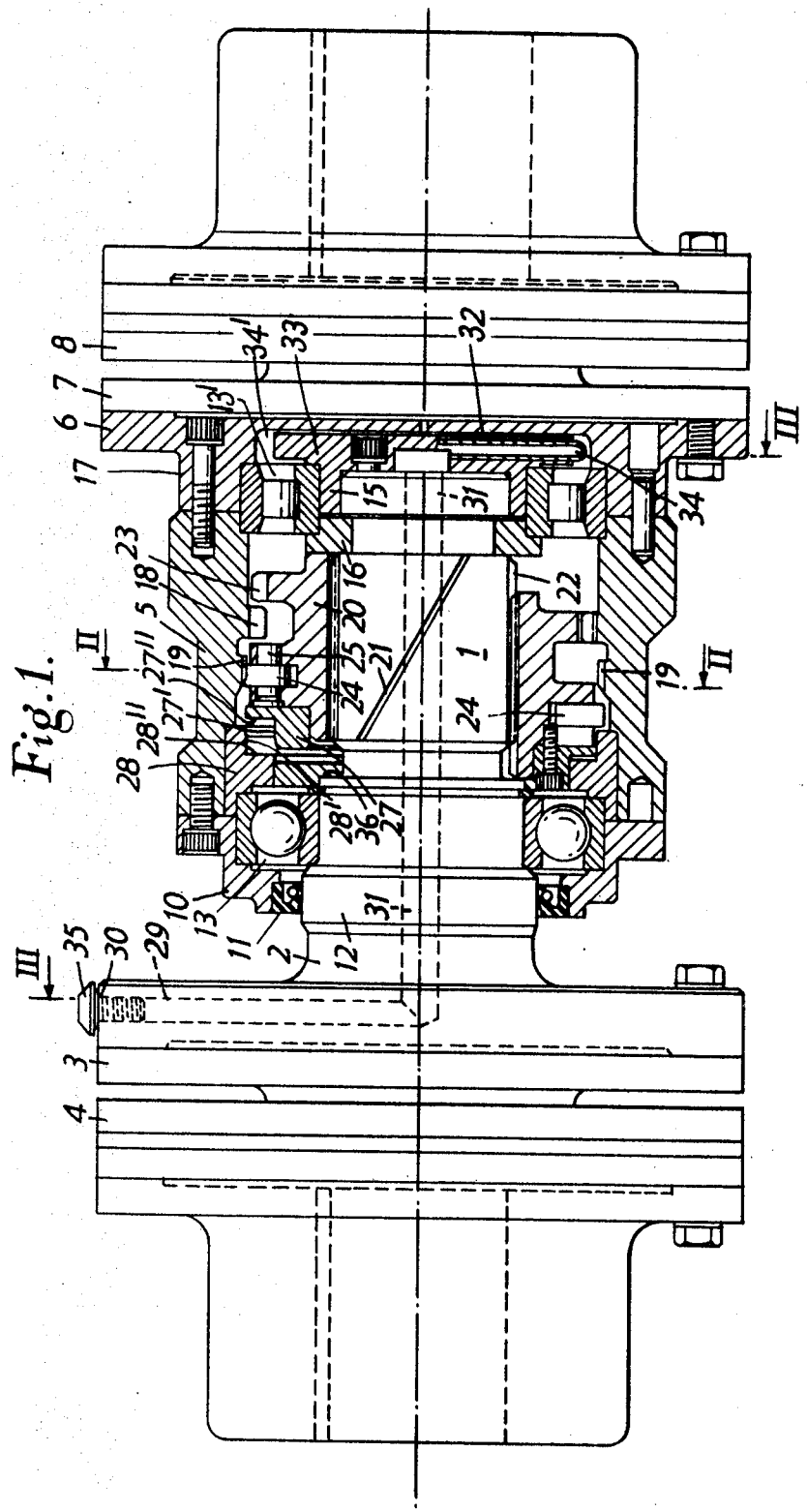

United States Patent

[11] 3,534,843

[72] Inventors Harold Sinclair,
London, and
Herbert A. Clements, Weybridge, Surrey,
England
[21] Appl. No. 752,653
[22] Filed Aug. 14, 1968
[45] Patented Oct. 20, 1970
[73] Assignee S.S.S. Patents Limited
London, England
[32] Priority Aug. 23, 1967
[33] Great Britain
[31] 38,842/67

[54] LUBRICATED SYNCHRONOUS POSITIVE CLUTCH
3 Claims, 3 Drawing Figs.
[52] U.S. Cl. ..................................... 192/113,
192/67, 192/30
[51] Int. Cl. ...................................... F16d 13/72
[50] Field of Search............................ 192/67(A),
53.8, 105(A), 85(F), 103.2, 30(W1)

[56] References Cited
UNITED STATES PATENTS
3,175,661 3/1965 Maurer et al. ............... 192/113.2X
3,272,295 9/1966 Clements...................... 192/67(A)
3,402,794 9/1968 Sinclair et al. ................ 192/67(A)

Primary Examiner— Benjamin W. Wyche III
Attorney— Woodcock, Phelan and Washburn

ABSTRACT: An overrunning clutch wherein pawl and ratchet mechanism and/or bearings are located within a casing rotatable with the output member of the clutch, the casing being formed with a chamber in which a rotating ring of lubricating oil forms when the output member is rotating at a sufficiently high speed. An oil transfer passage between the chamber and an orifice in the input member of the clutch enables the oil in the clutch to be replenished through the orifice by stopping the input member whilst the output member and driven machine continue to run. A scoop tube rotatable with the input member has its scooping orifice in the chamber. By stopping the input member and opening the orifice the quantity of oil in the clutch can be checked whilst the driven machine continues to run, since with sufficient oil in the clutch oil is transferred by the scoop tube to the orifice, where active bubbling takes place. If the quantity of oil in the clutch is insufficient no such bubbling effect is observed.

LUBRICATED SYNCHRONOUS POSITIVE CLUTCH

This invention relates to overrunning clutches wherein a part or parts needing lubrication, e.g. pawl and ratchet mechanism for initiating clutch engagement, and/or bearings, is or are located within a casing that can be connected for rotation with an output shaft.

In such overrunning clutches, which are suitable e.g. for mounting in association with flexible couplings upon substantially coaxial input and output shafts, it is a problem to ensure that adequate lubrication of the said part or parts is maintained. An object of the invention is to provide a solution to this problem.

In accordance with the invention there is provided an overrunning clutch wherein the output member of the clutch comprises a casing that houses a part or parts needing lubrication, the casing being formed with a chamber wherein a rotating ring of oil for lubricating said part or parts can form when the output member is rotating at a sufficiently high speed, and the clutch including an oil transfer passage communicating with said chamber and having in the clutch input member an orifice, with closure means, that can be opened for replenishing the oil in said chamber.

In some cases, e.g. where a machine driven through the intermediary of a clutch according to the invention may be required to be in uninterrupted service for lengthy periods, it is very desirable to be able to check and if necessary replenish the quantity of oil in the clutch from time to time without stopping the driven machine to which the output member of the clutch is coupled. A further object of the invention is to provide a solution to this problem, and in accordance with a further feature of the invention oil transfer means are provided whereby, with the clutch output member rotating at a sufficiently high speed and with the clutch input member stationary, the presence of a sufficient quantity of oil in the clutch can be made evident by the appearance of oil at said orifice when open.

Figure 2:
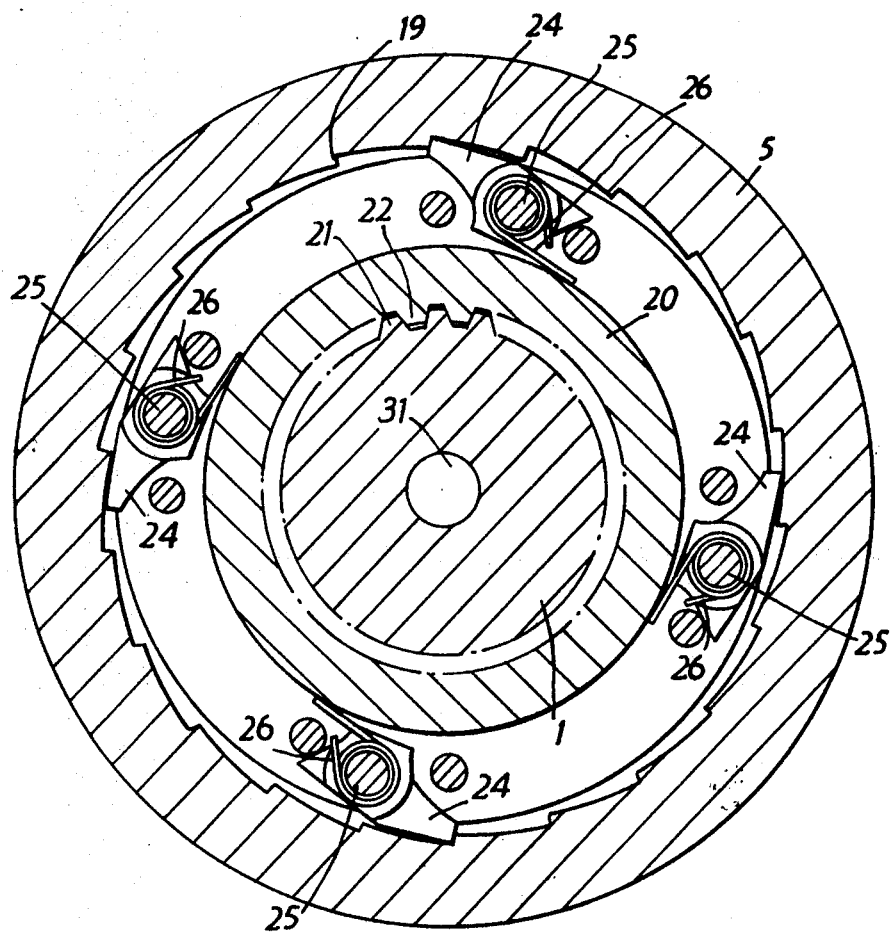
Figure 3:
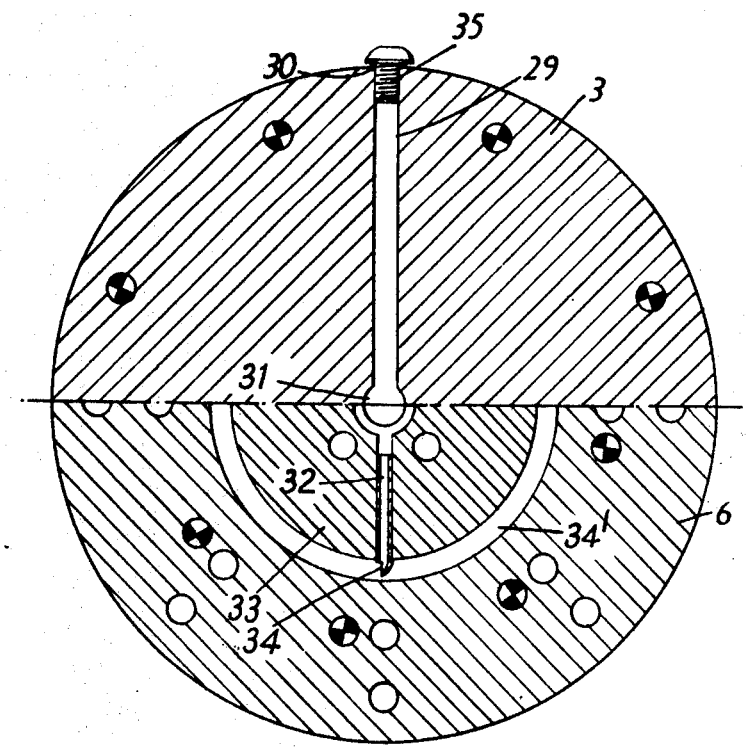

In the accompanying drawings,

FIG. 1 is a view in longitudinal section on the axis of a clutch embodying the invention, the clutch being shown disengaged in the upper half of the FIG. and being shown engaged in the lower half of the FIG., FIG. 2 is a section on the line II–II of FIG. 1, and FIG. 3 is a section on the line III–III of FIG. 1, the upper half of the FIG. showing a filling duct associated with the input member of the clutch, and the lower half of the FIG. showing a scoop tube serving as the above-mentioned transfer means.

Referring to the drawings, the input member 1 of the clutch is formed on a shaft 2 having a flange 3 connected through a flexible coupling 4 to a driving shaft (not shown). The input member 1 projects into a substantially cylindrical part 5 to which is bolted a ring 6 bolted in turn to an end closure ring 7 which is connected through a flexible coupling 8 to an output shaft (not shown). The end of the part 5 remote from the ring 7 has bolted to it a ring 10 carrying an oil seal 11 which engages a flange 12 on the shaft 2. The part 5, end closure ring 7 and ring 10 with the oil seal 11 together constitute the output member of the clutch and form a closed casing that houses the bearing of the clutch and the pawl and ratchet mechanism to be described. The input member 1 is journaled within the said casing in two axially spaced bearings 13 and 13', the bearing 13 being a ball bearing the inner race of which is carried by the shaft 2 and the outer race of which is located partly within the ring 10 and partly within a ring 28 carried by the part 5. The bearing 13' is a roller bearing, the inner race of which is mounted partly on a cylindrical extension 15 of a plate 33 and partly on a stop ring 16, and the outer race of which is located partly within the part 5 and partly within a cylindrical extension 17 of the ring 6.

The part 5 is formed with a ring of internal clutch teeth 18 and with a ring of internal ratchet teeth 19. An intermediate member 20 is formed with internal right-hand helical splines 21 engaged with external helical splines 22 formed on the input member 1. The intermediate member 20 is also formed with a ring of external clutch teeth 23, which with the clutch fully disengaged as shown in the upper part of FIG. 1 are positioned to one side of the internal clutch teeth 18. The intermediate member 20 also carries four pawls 24 arranged in diametrically opposite pairs on pawl pins 25. In the disengaged condition of the clutch the pawls 24 are radially aligned with the internal ratchet teeth 19. The pawls 24 are provided with control springs 26 which urge the noses of the pawls radially outwards, the noses of the pawls pointing in anticlockwise direction as viewed in FIG. 2.

The intermediate member 20 carries, at the end remote from the closure ring 7, a ring 27 having a substantially cylindrical surface 27' parallel to the clutch axis and a plane surface 27'' normal to the clutch axis, to form one member of a dashpot. The ring 28 is formed with a substantially cylindrical surface 28' parallel to the clutch axis and a plane surface 28'' normal to the clutch axis, to form another member of the dashpot. When the clutch is in the fully disengaged condition the rings 27 and 28 are spaced axially from one another as shown in the upper half of FIG. 1, so that there is between them a relatively wide gap which during the rotation of the clutch output member is charged with lubricating oil under the action of centrifugal force.

In the flange 3 on the shaft 2 there is formed a duct 29 which extends from a filling orifice 30 situated at the outer periphery of the flange 3 to the centre of the flange 3, where it communicates with a duct 31 which extends axially of the shaft 2 and input member 1 and communicates with the outlet end of a scoop tube 32 mounted in a plate 33 bolted to the input clutch member 1, the scoop tube 32 having its scooping orifices 34 projecting from the plate 33 into a chamber 34' within the closed casing formed by the part 5, closure ring 7 and ring 10 with the oil seal 11. The scooping orifice 34 faces in the direction opposite to that in which the output clutch member 5 rotates (anticlockwise in FIG. 3). The said closed casing may be formed with an annular groove which serves as a scoop chamber into which the scooping end of the scoop tube 32 projects. The radial location of the scooping orifice 34 is such that when the output member of the clutch is rotating the tip of the scooping orifice is in contact with the annulus of lubricating oil that is formed within the chamber 34'.

Initially, lubricating oil is fed into the clutch through the orifice 30, the oil transfer passage constituted by the ducts 29 and 31, and the scoop tube 32, and the orifice 30 is then closed by a plug 35.

The operation of the clutch is as follows:

Assume that the input member 1 is stationary, and that the part 5 is rotating in anticlockwise direction as seen in FIGS. 2 and 3. Under these circumstances the intermediate member 20 is in the position, shown in the upper half of FIG. 1, corresponding to full disengagement of the clutch and is against the stop ring 16, and the ratchet teeth 19 ratchet past the noses of the pawls 24. The gap between the rings 27 and 28 is full of oil under centrifugal pressure, and the ring of oil formed within the casing 5, 7, 10, 11 extends to the end walls of the casing so that the axial hydrostatic pressures therein are balanced.

If now the input shaft and clutch input member 1 are accelerated in the same direction as the clutch member, viz. in anticlockwise direction as viewed in FIG. 2, the intermediate member 20 rotates in the same direction. Initially the ratchet teeth 19 continue to ratchet past the noses of the pawls 24. When the input member 1 passes through synchronism with part 5, a pair of pawls 24 engage two respective ratchet teeth 19, and due to the interaction of the interengaged helical splines 21 and 22 the intermediate 20 is shifted helically along the input member 1 (to the left in FIG. 1) to engage its clutch teeth 23 precisely with the internal clutch teeth 18 of part 5.

During the clutch engaging movement of the intermediate member 20 the ring 27 carried by it approaches the ring 28 carried by the part 5, and the reduction in the width of the gap between the rings 27 and 28 causes oil to be progressively forced out of the gap. There is thus some initial restraint on the movement of the intermediate member 20, and as the path available for passage of oil out of the said gap becomes increasingly narrower the restraint on the movement of the intermediate member becomes increasingly greater. Towards the end of the clutch engaging movement of the intermediate member 20 the rings 27 and 28 cooperate to form an annular dashpot which is substantially closed with the exception of restricted leakage paths, so that the final part of the clutch engaging movement of the intermediate member 20 is cushioned.

When the intermediate member 20 has moved up to an axial stop 36, the clutch teeth 18 and 23 are fully interengaged and the driven machine is driven by the input member 1.

If the rotation of the input member 1 is now retarded, the interaction of the clutch teeth 18 and 23 and of the helical splines 21 and 22 causes the intermediate member 20 to shift out of toothed engagement with the part 5 helically along the member 1 (to the right in FIG. 1) and during this movement of the intermediate member 20 the rings 27 and 28 separate, and the widening gap between them automatically fills with oil under the action of centrifugal pressure. Hence, even if clutch disengagement is followed very rapidly by a further clutch engagement, the dashpot will again be effective to cushion the clutch engaging movement of the intermediate member 20.

In order to check the quantity of oil in the clutch the driving machine and input member 1 are brought to rest, so that the clutch overruns and the driven machine continues to run. Under these conditions the scoop tube 32 is stationary, and if there is sufficient oil in the clutch the ring of oil into which its scooping orifices 34 projects is rotating in the direction (anticlockwise in FIG. 3) such that some of the oil enters the scooping orifice 34 and creates pressure within the ducts 29 and 31.

If now the plug 35 is removed from the inlet orifice 30, with a sufficient quantity of oil in the clutch, oil picked up from the said ring by the scoop tube 32 will be transferred to the ducts 29 and 31, and if the quantity of oil in the clutch is sufficient this is made obvious by active bubbling at the orifice 30. Insufficient filling of the clutch with oil will be made apparent by the absence of oil at the said orifice, and the oil can be replenished through the orifice 30, which is stationary, whilst the driven machine continues to run; completion of filling to the required degree being indicated by the above-mentioned bubbling effect.

We claim:

1. An overrunning clutch comprising an input member and an output member, said input and output members being drivably engaged when the clutch is engaged and being disengaged when the clutch is overrunning, said output member comprising a casing, at least one part needing lubrication housed in said casing, and said casing being formed with a chamber wherein a rotating ring of oil for lubricating said part can form when said output member is rotating at a sufficiently high speed, the improvement including the features that said input member is formed with an orifice, that openable closure means are provided for said orifice, and that the clutch is formed with an oil transfer passage that communicates with said chamber and with said orifice.

2. An overrunning clutch according to claim 1 including oil transfer means whereby, with said output member rotating at a sufficiently high speed and with said input member stationary the presence of a sufficient quantity of oil in the clutch can be made evident by the appearance of oil at said orifice when open.

3. An overrunning clutch according to claim 2 wherein said oil transfer means comprise a scoop tube having a scooping orifice and an outlet, and means mounting said scoop tube for rotation with said input member with said scooping orifice in said chamber and said outlet in communication with said oil transfer passage.

PO-1050
(5/69)

UNITED STATES PATENT OFFICE
CERTIFICATE OF CORRECTION

Patent No. 3,534,843    Dated October 20, 1970

Inventor(s) Harold Sinclair and Herbert Arthur Clements

It is certified that error appears in the above-identified patent and that said Letters Patent are hereby corrected as shown below:

IN THE DRAWINGS:

Sheet 1, Fig. 1, the area shown cross-hatched in the upper center of this figure directly beneath the ring 28 and filling the space between ring 28 and the axial stop 36 should be removed.

Signed and sealed this 16th day of May 1972.

(SEAL)
Attest:

EDWARD M. FLETCHER, JR.
Attesting Officer

ROBERT GOTTSCHALK
Commissioner of Patents